US008266522B2

(12) United States Patent
Dugonjic et al.

(10) Patent No.: US 8,266,522 B2
(45) Date of Patent: Sep. 11, 2012

(54) METHOD AND DEVICE FOR TEMPORALLY DISPLAYING ADVERTISING CONTENT ON A WEBPAGE

(75) Inventors: Aleks Dugonjic, Brampton (CA); Christopher Pavlovski, Brampton (CA)

(73) Assignee: Jokaroo Entertainment Inc., Toronto, Ontario (CA)

( * ) Notice: Subject to any disclaimer, the term of this patent is extended or adjusted under 35 U.S.C. 154(b) by 250 days.

(21) Appl. No.: 12/425,655

(22) Filed: Apr. 17, 2009

(65) Prior Publication Data

US 2010/0269030 A1 Oct. 21, 2010

(51) Int. Cl.
*G06F 17/00* (2006.01)

(52) U.S. Cl. .......................... 715/234; 715/240; 715/246

(58) Field of Classification Search .................. 715/201, 715/210, 234, 239, 273, 716, 760, 790
See application file for complete search history.

(56) References Cited

U.S. PATENT DOCUMENTS 6,034,661 A * 3/2000 Servan-Scheiber et al. .. 345/668
6,317,761 B1 11/2001 Landsman et al.
7,313,622 B2 12/2007 Lee et al.
2008/0077952 A1* 3/2008 St. Jean et al. .................. 725/32
2008/0288973 A1* 11/2008 Carson et al. ................... 725/32
2008/0320512 A1* 12/2008 Knight ............................ 725/32

OTHER PUBLICATIONS

Christopher Schmitt, CSS and Opacity: Methods for creating translucent elements, Aug. 15, 2008, pp. 1-4.*
Jennifer Niederst Robbins, Web Design in a Nutshell, Pub. Feb. 21, 2006, O'Reilly Media, 3rd Edition, pp. 534,555.*
Abraham Chaffin, Full Page Overlay Window, 2008, CreativeCOW.net, pp. 1-5.*
"Husky Media—Advertiser", http://www.huskymedia/com/advertiser/, 1 page.
Thomas Porter, et al., Compositing Digital Images, Computer Graphics, vol. 18, No. 3, Jul. 1984, pp. 253-259.
"TechNote—Flash OBJECT and EMBED tag attributes", http://kb.adobe.com/selfserviceiviewContent.do? externalld=tn_12701.

* cited by examiner

*Primary Examiner* — Adam M Queler
*Assistant Examiner* — Howard Cortes

(57) ABSTRACT

A computer-implemented method and computing device for temporally displaying advertising content on a webpage are disclosed. The webpage on which the advertising content is displayed may have a plurality of graphical, textual and audio/visual components. The advertising content is displayed around a first area of the webpage, for example, around a video player, such that it hides the original content of the webpage around the first area (e.g. hides the original content of the webpage around the video player). The transparency of the advertising content is increased over a defined time interval so that over the time interval, the underlying original content of the webpage around the first area (e.g. around the video player) becomes increasingly visible. At the end of the time interval, the advertising content disappears entirely. No user input is required to trigger the fade out of the advertising content. The fade out occurs automatically.

21 Claims, 13 Drawing Sheets fadeout.html

```
1   <html xmlns="http://www.w3.org/1999/xhtml">
2   <body>
3
4   ...
5
6   <!--Underlying video -->
7   <iframe
8   src="http://www.jokeroo.com/script2.php?channel=Funny_Videos&vid=http://uploads.filecabin.com/flash/
9   transformers_stop_motion.flv" frameborder="0" marginheight="0" marginwidth="0" scrolling="no"
10  width="491" height="426" name="commercial" target="_blank"></iframe>
11
12  <!-- Begin Fade Out -->
13  <script type="text/javascript" src="/scripts/jquery-1.2.2.pack.js"></script>
14  <script type="text/javascript" src="/scripts/jquery.dimensions.pack.js"></script>
15  <script type="text/javascript" src="/scripts/flash.js"></script>          ← FIG. 8
16  <script type="text/javascript" src="/scripts/fadeout.js"></script>        ← FIG. 7
17  <script type="text/javascript">
18  var $j = jQuery.noConflict();
19  var ad_swf = "";
20  var ad_campaign_id = "";
21  var ad_stay_secs = "";
22  var ad_fadeout_secs = "";
23  var intval="";
24  var fadeout_div="";
25  var campaign_id="0";
26  var vid="http://uploads.filecabin.com/flash/transformers_stop_motion.flv";
```

```

function HideFadeOut()
{
        fadeout_div.remove();
}

function ShowFadeOut(swf, campaign_id, stay_secs, fadeout_secs)
{
        ad_swf=swf;
        ad_campaign_id=campaign_id;
        ad_stay_secs=stay_secs;
        ad_fadeout_secs=fadeout_secs;
}

$j(document).ready(function(){
...
document.getElementById("iframe_fadeout").src="http://www.jokeroo.com/fadeout.php?vid=http://
        uploads.filecabin.com/flash/transformers_stop_motion.flv&inactive=1&force=1&width="+screen
        .width+"&height="+screen.height;
intval=setInterval("DisplayFadeout();", 1000); });
</script>

<iframe src="" width="0" height="0" frameborder="0" marginheight="0" marginwidth="0" scrolling="no"
        style="visibility:hidden" id="iframe_fadeout" name="iframe_fadeout"></iframe>
<!-- End Fade Out -->
```

S5016 (lines 28–31)

S5004 (lines 33–38)

*FIG. 7* (arrow to line 46)

S602 (lines 49–50)

```
...

</body>
</html>
```

FIG. 6C fadeout.js

```
function DisplayFadeout()
{

        // Display the Fade-Out
        if( top.ad_swf != "")
        {
                top.fadeout_div = $j('<div id="aaaa"
                style="position:absolute;top:0px;left:0px;width:100%;height:100%;display:block;z-
                index:1000;"><div id="fadeout" style="cursor:pointer"></div></div>');

                $j("body").append(top.fadeout_div);

                // detect browser and set offsets accordingly
                ...


                loadFlashWmode("fadeout",theWidth,$j(document).height(),
                   "/sandbox/fadeout.swf","FadeOutSWF="+ad+screen.width+"x"+screen.height+".swf&targetURL="+t
                   argetURL+"&background_color="+background_color+"&window_width="+$j(window).width()+"&windo
                   w_height="+$j(window).height()+"&browser="+browser+"&document_height="+$j(document).height
                   ()+"&stay_secs="+ad_stay_secs+"&fadeout_secs="+ad_fadeout_secs+'&'+offsets);

                top.ad_swf = '';
                clearInterval(top.intval);
        }
}
```

FIG. 7 flash.js

802

S5010

```
function loadFlashWmode(obj,w,h,flash,vars){
    txt='<object classid="clsid:d27cdb6e-ae6d-11cf-96b8-444553540000"
        codebase="http://fpdownload.macromedia.com/pub/shockwave/cabs/flash/swflash.
        cab#version=7,0, 0,0" width="'+w+'" height="'+h+'" id="500x447" align="middle">';
    txt+='<PARAM NAME=allowFlashAutoInstall VALUE=true><param name=Flashvars value="'+vars+'" />';
    txt+='<param name="allowScriptAccess" value="sameDomain" />';
    txt+='<param name="movie" value="'+flash+'" />';
    txt+='<param name="wmode" value="transparent" />';
    txt+='<param name="quality" value="high" /><param name="bgcolor" value="#FFFFFF" />';
    txt+='<embed wmode="transparent" src="'+flash+'" swLiveConnect="true" Flashvars="'+vars+'"
        quality="high" bgcolor="#FFFFFF" width="'+w+'" height="'+h+'" name="320x240" align="middle"
        allowScriptAccess="sameDomain" type="application/x-shockwave-flash"
        pluginspage="http://www.macromedia.com/go/getflashplayer" />';
    document.getElementById(obj).innerHTML=txt;
}
```

FIG. 8 fadeout.swf

Figure 9:
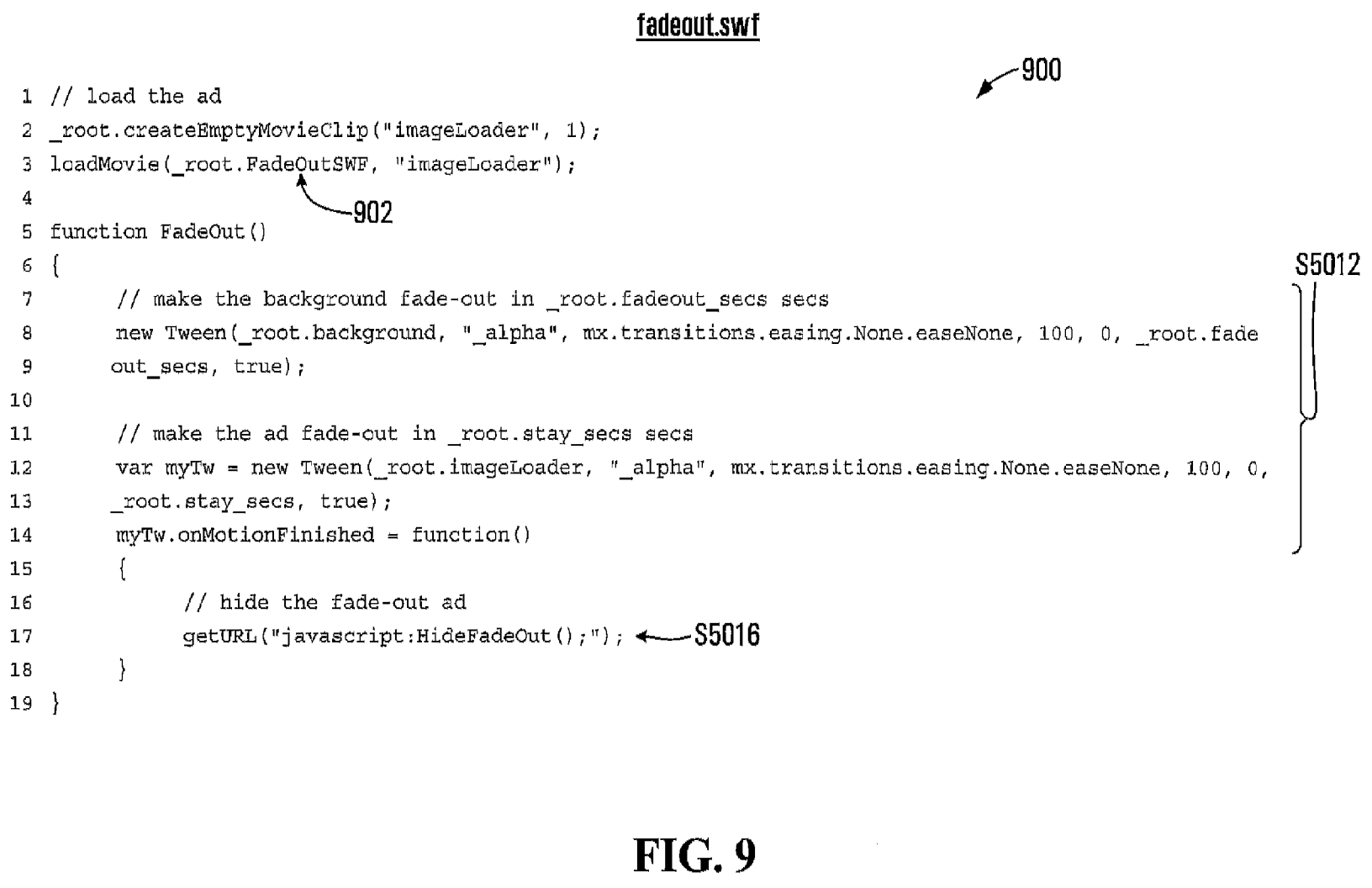

900

```
// load the ad
_root.createEmptyMovieClip("imageLoader", 1);
loadMovie(_root.FadeOutSWF, "imageLoader");

function FadeOut()
{
     // make the background fade-out in _root.fadeout_secs secs
     new Tween(_root.background, "_alpha", mx.transitions.easing.None.easeNone, 100, 0, _root.fade
     out_secs, true);

     // make the ad fade-out in _root.stay_secs secs
     var myTw = new Tween(_root.imageLoader, "_alpha", mx.transitions.easing.None.easeNone, 100, 0,
     _root.stay_secs, true);
     myTw.onMotionFinished = function()
     {
          // hide the fade-out ad
          getURL("javascript:HideFadeOut();");
     }
}
```

METHOD AND DEVICE FOR TEMPORALLY DISPLAYING ADVERTISING CONTENT ON A WEBPAGE

BACKGROUND

The present invention relates generally to a method of displaying an Internet advertisement over a webpage.

Advertising on the Internet has become ubiquitous such that it is relatively uncommon today to encounter a webpage that does not contain some form of advertising. Indeed, Internet advertising is now so pervasive that it may be the primary means by which a website operator obtains revenue from the website. For example, the website operator may be paid a certain amount of money per user-click on the advertisement (so-called "click-through" advertising). Other models of Internet advertising revenue generation are known.

In the early days of Internet advertising, advertisements placed across the top, bottom or sides of a webpage, otherwise known as static banner ads, were common. As technology progressed, more dynamic advertisements were introduced. One such example is the pop-up ad, where a new Internet browser window containing the advertisement is spawned in response to the user clicking a link. The pop-up window is displayed on top of the webpage that the user desires to access. In order to clear the advertisement, so that the user may read the underlying content, the user typically must take action to close the pop-up window.

Unfortunately, over time, Internet users have become accustomed to certain types of advertisements (e.g. banner ads); consequently, users no longer pay much attention to the advertisements. In a more extreme example, users have become so irritated by certain types of obtrusive advertisements, e.g. the pop-up advertisement, that Internet browser developers have, presumably in response to consumer demand, developed ways of blocking those advertisements (e.g. pop-up blockers). Of course, advertisements are ineffective when users ignore them or are irritated by them.

There is therefore a need for a novel method of Internet advertising.

SUMMARY OF THE INVENTION

The present invention relates to a method of hiding all but a certain area of the underlying webpage with the advertisement, and over time, fading out the advertisement to reveal other areas of the underlying webpage.

Specifically, a computer-implemented method and computing device for temporally displaying advertising content on a webpage are disclosed. The webpage on which the advertising content is displayed may have a plurality of graphical, textual and audio/visual components. The advertising content is displayed around a first area of the webpage, for example, around a video player, such that it hides the original content of the webpage around the first area (e.g. hides the original content of the webpage around the video player). The transparency of the advertising content is increased over a defined time interval so that over the time interval, the underlying original content of the webpage around the first area (e.g. around the video player) becomes increasingly visible. At the end of the time interval, the advertising content disappears entirely. No user input is required to trigger the fade out of the advertising content. The fade out occurs automatically.

In a first aspect of the invention, there is provided a computer-implemented method of temporally displaying advertising content around a first area of a webpage that includes a plurality of textual, graphical and audio/video components. The method comprises overlaying the advertising content on a second area of the webpage so as to hide original content of the webpage at the second area. The second area at least substantially surrounds the first area, and the advertising content hides only the original content at the second area and not the original content at the first area. The method further comprises increasing transparency of the advertising content over a time interval so that the original content at the second area of the webpage is increasingly visible through the advertising content over the time interval. Original content at the first area is visible throughout the time interval and at the end of the time interval the advertising content is no longer visible and the original content at the second area is fully visible.

In another aspect of the invention, there is provided a computing device for temporally displaying advertising content around a first area of a webpage that includes a plurality of textual, graphical and audio/video components. The computing device includes a display. The computing device also includes a processor operable to: overlay the advertising content on a second area of the webpage so as to hide original content of the webpage at the second area. The second area at least substantially surrounds the first area, and the advertising content hides only the original content at the second area and not the original content at the first area. The processor is further operable to: increase transparency of the advertising content over a time interval so that the original content at the second area of the webpage is increasingly visible through the advertising content over the time interval. Original content at the first area is visible throughout the time interval and at the end of the time interval the advertising content is no longer visible and the original content at the second area is fully visible.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

FIGS. 6A, 6B and 6C depict selected lines of mark-up language source code defining the webpage of FIG. 3;

FIG. 7 depicts selected lines of code for a function called from the code of FIGS. 6A, 6B and 6C;

FIG. 8 depicts selected lines of code included in the advertisement of FIG. 3;

FIG. 9 depicts selected lines of code for performing a fadeout effect in accordance with the present invention;

DETAILED DESCRIPTION

Figure 1:
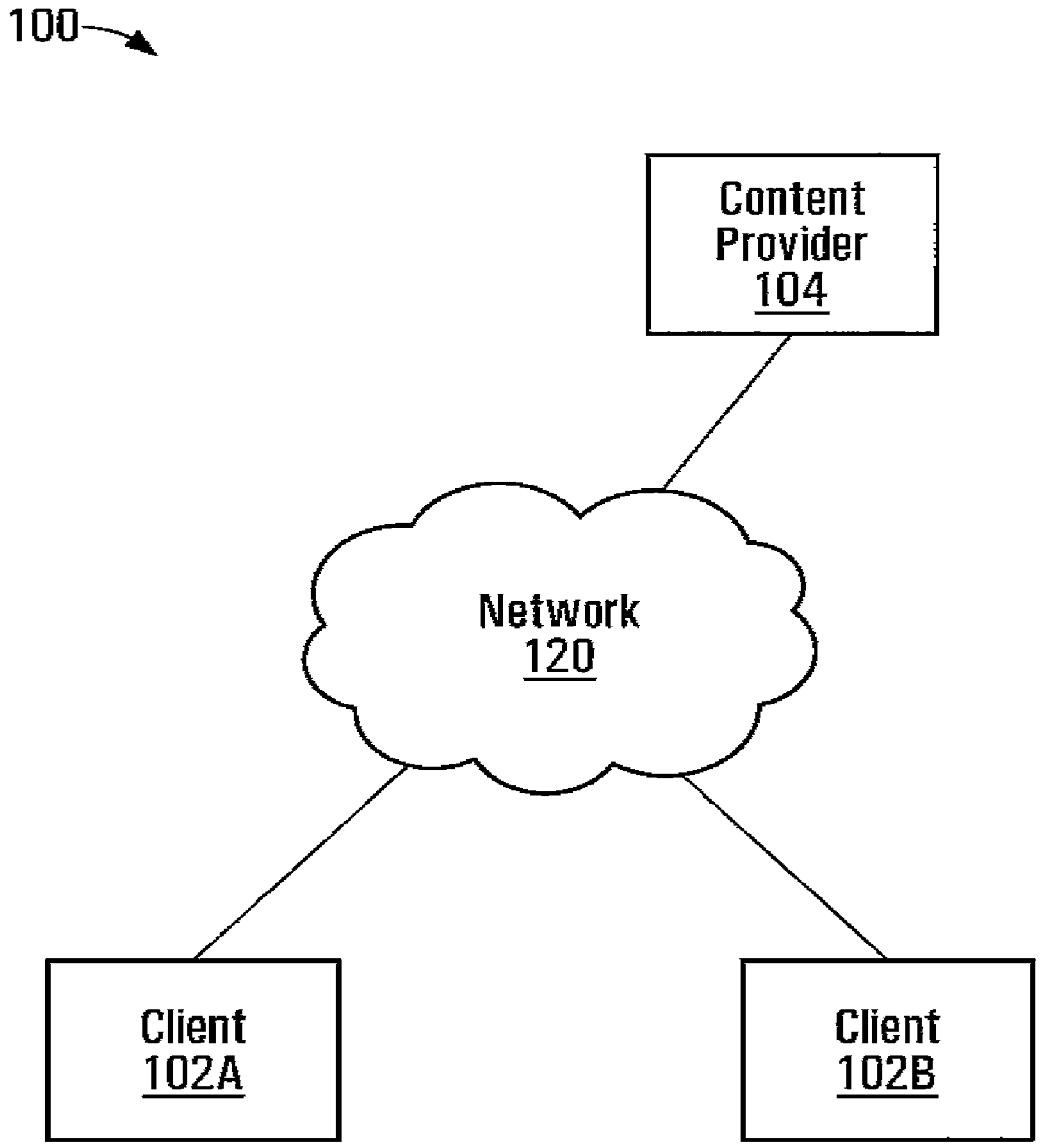
FIG. 1 is a simplified block diagram of a system for use with the present invention.

FIG. 1 depicts a system 100 which may be used with an embodiment of the present invention. System 100 may have one or more client computing devices 102*a* and 102*b* (collectively, client device 102), interconnected via a computer communications network 120 to a content provider 104. Network 120 may be a conventional wide area network, a wireless wide area network (which includes cellular networks), or other communications networks known to those of ordinary skill, through which client device 102 may access the Internet. Content provider 104 may be a webserver which hosts and serves webpages over network 120, in a conventional manner, to requesting client device 102.

Figure 2:
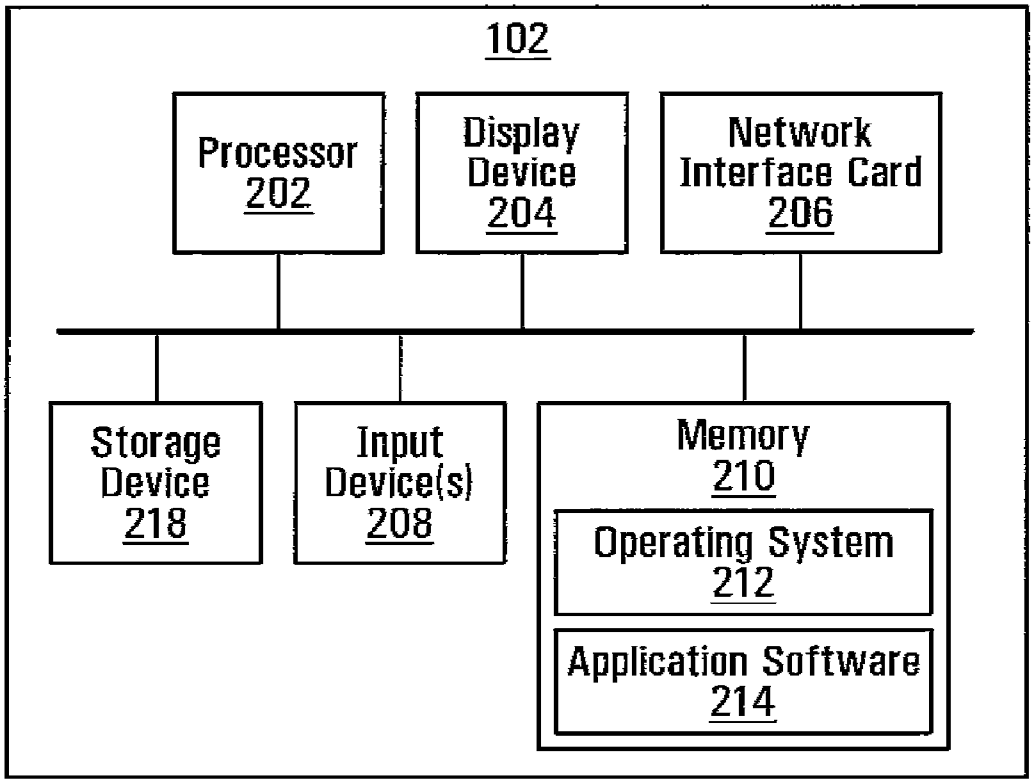
FIG. 2 is a simplified block diagram depicting selected components of a client device in the system of FIG. 1.

With reference to FIG. 2, client device 102 may be a conventional computer system having a processor 202, a display device 204 (e.g. a monitor), a network interface card 206 that provides connectivity of device 102 to network 120, one or more input devices 208 (e.g. a keyboard and mouse), a persistent storage device 218 such as a conventional hard drive or other type of persistent memory (e.g. Flash memory cards), and a system memory 210. System memory 210 may host operating system 212 (such as Windows XP, Vista, Mac OS X) and application software 214. Notably, application software 214 may include a conventional Internet web browser such as Internet Explorer, Firefox, Safari, or the like. While client device 102 has been described above as a conventional personal computer, it may be appreciated that equally, computing device 102 may be a web-enabled mobile device such as a web-enabled cellular phone, personal digital assistant, or smartphone. In this case, it may be appreciated that components 202, 204, 206, 208, 218, and 210 may be equivalent components tailored to a mobile device.

Figure 3:
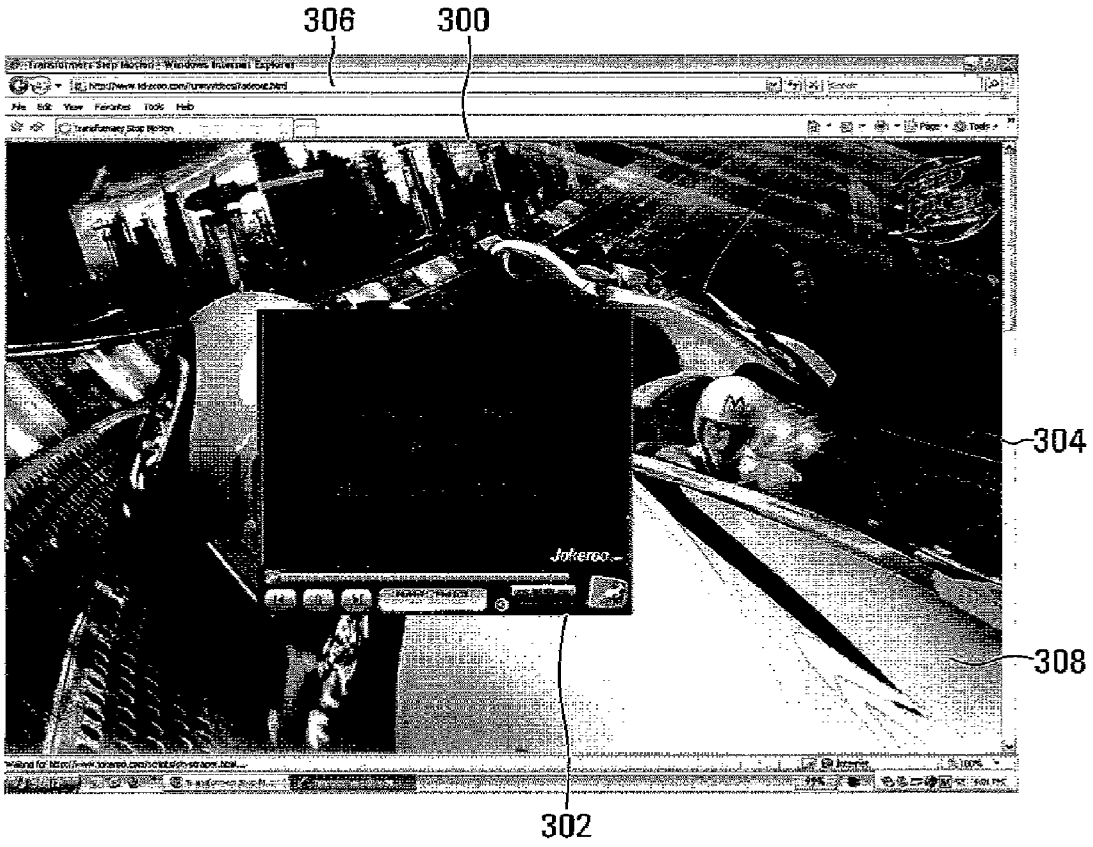
FIG. 3 is an exemplary screenshot of a webpage displayed at the client device of FIG. 2, which webpage is displaying an advertisement in accordance with the present invention.

Using client device 102, a user may, in a conventional manner, navigate to webpage 300 (FIG. 3). In particular, the user may enter the URL (Universal Resource Locator) for the webpage 300 into the address bar 306 of web browser 214 using an input device 208. In the example shown in FIG. 3, the URL of webpage 300 points to an html file named "fadeout.html). Webpage 300, or more specifically, the fadeout.html file, may be hosted at content provider server 104 and upon request by client device 102, may be sent over network 120 for display at client device 102. Specifically, and as may be known by those of ordinary skill in the art, webpage 300 may be coded in the form of a mark up language document (in this example, the mark up language is HTML and the name of the document is fadeout.html), which document may be sent by content provider server 104 over network 120 to requesting client device 102 using a conventional network communications protocol (e.g. HTTP). Upon receipt of the document (i.e. the fadeout.html file), web browser 214 hosted on client device 102 may parse, interpret, and display its contents (i.e. webpage 300) on display device 204.

Referring now to FIG. 3, exemplary webpage 300 may be an entertainment webpage. Webpage 300 may, in particular, include a video player 302 at a first area. A second area may at least substantially surround the video player 302 ("surrounding area 304"). As will be further explained below, advertising content may be overlaid on surrounding area 304. In the exemplary embodiment, surrounding area 304 completely surrounds video player 302. Advantageously, by completely surrounding video player 302 with advertising content 308, as further described below, the user's attention may be better directed to the advertising content. However, it may be appreciated that surrounding area 304 may merely substantially surround video player 302, and the user's attention may nevertheless be sufficiently directed to the advertising content.

Video player 302 may be a conventional video player such as Macromedia/Adobe FLASH Player and may be embedded in webpage 300 in a manner known to those of ordinary skill in the art. As will be further detailed below, for example, the video player 302 may be embedded into webpage 300 using an inline floating frame (delimited by <iframe> HTML tags) with the source of the frame specified as a URL of the movie to be played in video player 302 (e.g. the URL address of the movie on a server, for example, content provider server 104).

Figure 4:
FIG. 4 is an exemplary screenshot of the webpage of FIG. 3 at a later time.

FIG. 4 is a screenshot of exemplary webpage 300 at a later time ("webpage 300'"). It may be observed that video player 302 remains in the same position relative to the other content 404 on the webpage; however, as may be expected, video player 302 displays a portion of the movie at a later point in time. It may also be observed that the content at surrounding area 304 is different on webpage 300 than on webpage 300'. More specifically, on webpage 300, exemplary advertising content 308 is overlaid in surrounding area 304 and hides or occludes the original content 404 at surrounding area 304. The original content 404 of webpage 300' may include a plurality of textual, graphical and audio/video components, including video player 302. However, notably, advertising content 308 does not hide movie player 302. Over a defined time interval, the transparency of advertising content 308 may be increased so that the original content 404 of the webpage at surrounding area 304 becomes increasingly visible through advertising content 308. However, since advertising content 304 does not hide video player 302, the content of video player 302 remains visible throughout the time interval.

Thus, as may now be appreciated, FIG. 3 is a screenshot of exemplary webpage 300 at the beginning of a time interval when advertising content 308 is fully visible and hides underlying original content 404 on webpage 304. FIG. 4 is a screenshot of webpage 300 (exemplary webpage 300') at the end of the time interval, when advertising content 308 has fully faded away and underlying original content 404 at surrounding area 304 is fully visible. Since, as is typical on many entertainment webpages, the movie playing in video player 302 may be the primary attraction on webpage 300/300', conveniently, such presentment of advertising content 308 may minimize user irritation because advertising content 308 does not hide the movie. Moreover, because advertising content 308 may fade away automatically, the user may not be forced to take any action to hide it, thus, further minimizing user irritation. However, because advertising content 308 when visible, may occupy a large portion of the area surrounding the video player 302, it may nevertheless engage the viewer's attention.

Operation of client device 102 to display exemplary advertising content 308 in the manner described above will now be discussed with reference to FIGS. 5-9.

As previously explained, exemplary webpage 300 may be written (or "coded") in a mark up language (for example, HTML, XML, or the like) document. Selected lines of code defining webpage 300 (contained in the file entitled fadeout.html) are provided in FIGS. 6A-6C. Webpage 300 may, in particular, be coded in a mixture of a mark up language (or a mixture of mark up languages) and one or more scripting languages (e.g. JAVASCRIPT, PHP, or the like) in a conventional manner. As may be appreciated by those of ordinary skill, the scripting code may be included in the mark up document itself (for example, see FIGS. 6A and 6B, lines 17-47) or it may be referenced from the mark up document (for example, see FIG. 6A, lines 15 and 16). In both cases, the scripting code or reference to the script may be placed between <script> and </script> HTML tags. Notably, and as will be further explained below, webpage 300 may contain a fadeout script 602 written in PHP (see FIG. 6B) which is contained in a frame element (e.g. <iframe> HTML element) of webpage 300.

In overview, and with reference to flow diagram S5000, client device 102 may first load webpage 300 (i.e. the fadeout.html file). Webpage 300 may contain fadeout script 602 (S5002). Advertisement characteristics, specifically, the advertisement, the advertisement campaign (i.e. the series of advertisements sharing the same theme or idea) with which the advertisement is associated, how many seconds the advertisement should appear, and how many seconds it should take to fade out, may then be set (S5004) by the fadeout script 602 (based on information in the script). In particular, and as will be further detailed below, fadeout script 602 may output JAVASCRIPT code that indicates the advertising campaign that is to be displayed. Conveniently, fadeout script 602 may query a database that returns an advertising campaign to be displayed based upon the requester's geographic location. Furthermore, fadeout script 602 may also output how many seconds the selected advertisement should appear and how many seconds it should take to fade out.

To properly position the advertising content, the resolution of display device 204, that is, the resolution at which the user is viewing exemplary webpage 300 may be detected. Other Internet browser 214 settings, such as the type of browser (e.g. Internet Explorer, Safari, etc.) may also be detected (S5006) as required (see FIG. 7, line 14). Instructions for the detection may be written in, for example, JAVASCRIPT. It should be appreciated that this step may be skipped altogether. However, explicit detection of Internet browser settings may allow for more accurate positioning of the overlaid advertising content.

At runtime, a section, for example, section 700 (FIG. 7) delimited by <div> HTML tags may be inserted into the code for webpage 300 (S5008). Section 700 may be used to contain the advertising content (e.g. advertising content 308) (see FIG. 7, lines 7-11). Subsequently, the object used to display the advertisement may itself be loaded inside <div> section 700 (S5010), and more specifically, inside <div> section 702 contained in <div> section 700 (see FIG. 8, lines 2-14).

Once the other set of code (i.e. the code for section 700 and code contained in section 700) has been inserted at runtime into webpage 300 as described above, the advertisement (i.e. advertising content 308) may be displayed according to previously defined ad characteristics (S5012). In the exemplary embodiment, the fadeout effect may be coded in ACTIONSCRIPT (see FIG. 9). As will be known by those of ordinary skill in the art, ACTIONSCRIPT is a scripting language that may be used in software development for Macromedia/Adobe Flash FLASH Player.

While advertising content 308 is being displayed, a script (e.g. another PHP script) tracks user clicks on the area covered by advertising content 308 (S5014). Such a script is commonly employed in web advertising and therefore could be implemented by one of ordinary skill in the art. Specifically, if a user click on advertising content 308 is detected, for example, from an input device 208 such as a mouse, the user may be redirected to another website (S5018). For example, a new browser window may be opened to display, for example, a webpage associated with a merchant website. Alternatively, the merchant webpage may be displayed in the same browser window that was previously displaying webpage 300. Operation may then end.

If no user click on advertising content 308 is detected, then the <div> section 700 for displaying the advertising content 308 may be removed (S5016) (see FIG. 9, line 15 and FIG. 6A, line 30) and then operation may end. In the latter instance, when operation ends, the original content of webpage 300 may be fully visible. It may be appreciated that the script that tracks user clicks on the area covered by advertising content 308 stops operating when advertising content 308 is no longer displayed.

Operation of client device 102 will now be described in even further detail with reference to the source code provided in FIGS. 6-9.

Figure 5:
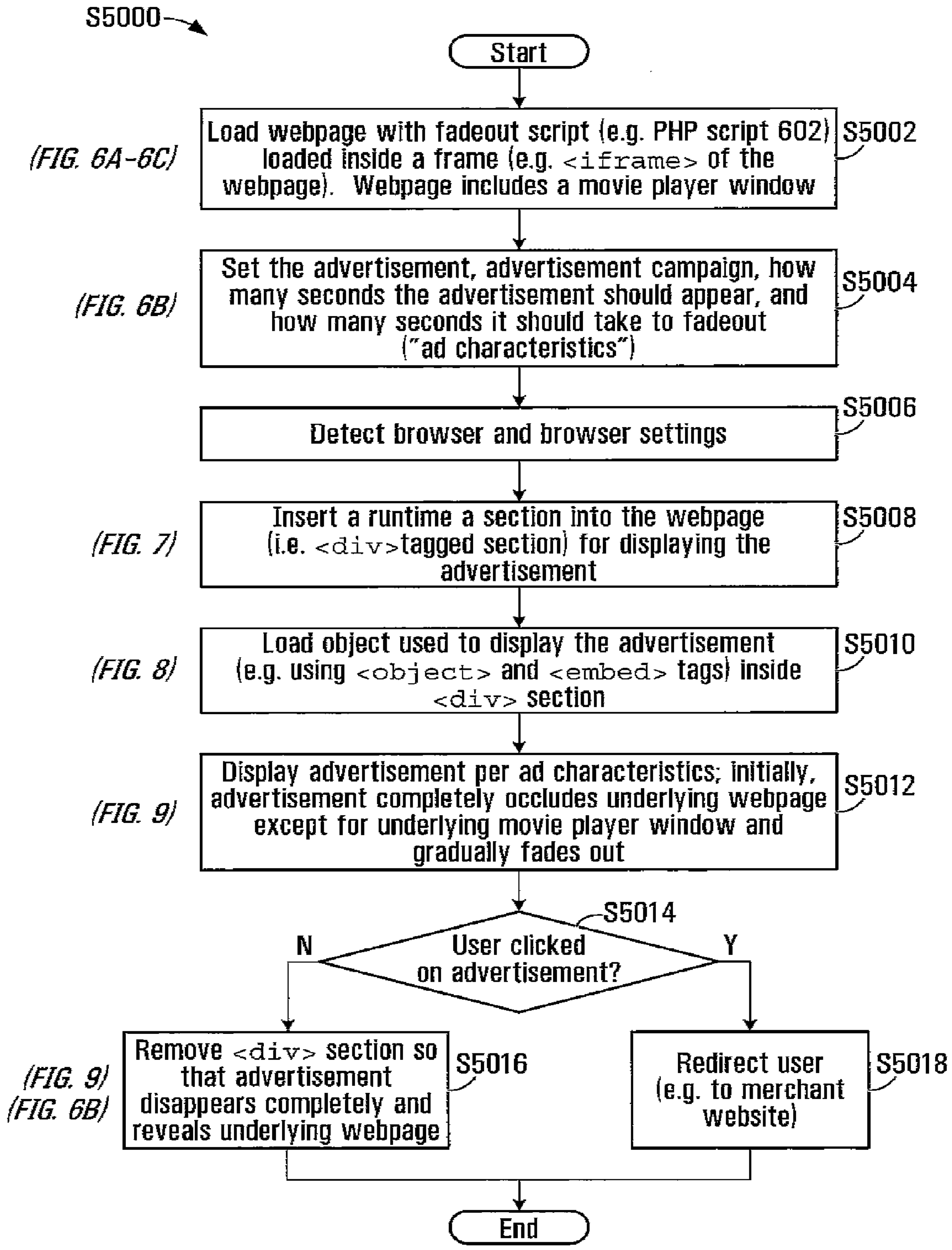
FIG. 5 is a flow diagram depicting operation of the client device of FIG. 2 in accordance with the present invention.

FIGS. 6A, 6B and 6C depict selected lines of mark-up language code defining the webpage of FIG. 3 that may be loaded by computing device 102 (FIG. 5, S5002). In the example, the code is contained in a file named fadeout.html but, of course, the name is arbitrary, and the file could be named something else. Line 1 of FIG. 6A specifies that the document is an HTML document. Line 2 indicates the beginning of the body of the HTML document. Lines 7-10 define an inline floating frame element 302 used to play the movie—as may be appreciated by those of ordinary skill, the frame is delimited by the <iframe> and </iframe> HTML tags on lines 7 and 10 respectively. The URL of the document to show in frame 302 is provided at line 8. More specifically, as illustrated, script2.php hosted at jokeroo.com is called and parameters specifying which movie to play (i.e. the movie contained in the file named "transformers_stop_motion.flv") is specified in the URL as a parameter. At lines 9 and 10, the width of the frame is set to 491 pixels, and the height of the frame set to 426 pixels. The utility of the other attributes of the <iframe> tag should be apparent to those of ordinary skill.

Lines 13-16 of FIG. 6A declare a number of scripts, coded in JAVASCRIPT, that will later be invoked by webpage 300 (since discussion is now at the code level, webpage 300 may hereinafter be referred to as "mark up document 300"). As may be known by those of ordinary skill in the art, the "jquery" scripts referenced at lines 13 and 14 refer to a JAVASCRIPT library, and will therefore not be further discussed herein. However, the scripts referenced at lines 15 and 16 are user-developed. Code for the "flash.js" script referenced at line 15 is provided in FIG. 8, and code for the "fadeout.js" script referenced at line 16 is provided in FIG. 7. As may be appreciated, the code for the scripts referenced at lines 13-16 are not embedded in mark up document 300 but may be stored on content provider server 104.

By contrast, the JAVASCRIPT code at lines 17-47 is embedded in mark up document 300. In particular, the script begins by declaring a number of variables at lines 19-26 including variables for storing a value indicating an ad movie ("ad_swf"), an ad campaign id ("ad_campaign_id"), a value indicating how long the ad should be displayed for ("ad_stay_secs"), a value indicating how long it should take the ad to fadeout ("ad_fadeout_secs"). It may be noted that the "vid" variable at line 26 stores the URL of the movie to be played in frame 302. As will be explained later, the values of these variables will ultimately be passed to the FLASH object that executes the fade out effect.

Moving further along in the fadeout.html code (document 300), two functions, HideFadeOut( ) and ShowFadeOut( . . . ), are defined at lines 28 to 39 (FIG. 6B). The HideFadeOut( ) function consists of one function call, fadeout_div.remove( ) (line 30). The value of the variable fadeout_div is initialized at line 24 and assigned in the Display- Fadeout( ) function (FIG. 7, line 7). The remove( ) function (a jquery library function) removes <div> section 700 added to document 300 by the fadeout.js script (FIG. 7, lines 7-9).

The ShowFadeOut( . . . ) function takes four parameters: "swf", "campaign_id", "stay_secs", and "fadeout_secs". The values of these parameters are then assigned to the "ad_swf", "ad_campaign_id", "ad_stay_secs", and ad_fadeout_secs" variables previously declared at lines 19-22 (FIG. 6A). Conveniently, the values of the parameters taken by the ShowFadeOut( . . . ) function may be obtained by the fadeout PHP script 602 from a database (not shown) and passed to the ShowFadeOut( . . . ) function (FIG. 5, S5004) when the ShowFadeOut( . . . ) function is called by the fadeout PHP script 602.

Exemplary PHP code that may form part of fadeout PHP script 602, which performs the functions described in the previous paragraph is provided below:

```
<script type="text/javascript">
top.ShowFadeOut('<?=$strFadeoutURL?>',
'<?=(isset($FadeoutCampaign)?$FadeoutCampaign->id:-1);?>',
'<?=$ConfigSystem->GetValue('fadeout_stay')?>', '<?=$ConfigSystem-
>GetValue('fadeout_time')?>');
</script>
```

Specifically, the $strFadeoutURL variable may contain the prefix URL of the inner SWF that loads inside fadeout.swf movie, the campaign ID is set if it hasn't been previously set, and the values for how long the advertisement should stay ('fadeout_stay') and the time it should take to fadeout ('fadeout_time') is obtained from the database.

A hidden floating inline frame element (i.e. a HTML <iframe> element) is defined at lines 49-50 (FIG. 6B). The frame is assigned the name "iframe_fadeout" using the frame's id attribute. As may be appreciated, because the iframe_fadeout element is hidden, it may not be rendered on display device 204.

Lines 41-46 (FIG. 6B) provide code to be executed by the jquery library ready( ) function. Specifically, as may be appreciated by a person of ordinary skill in the art, the function at lines 41-46 may be executed whenever the DOM (Document Object Model) is ready to be traversed and manipulated in preparation for rendering mark up document 300 on display device 204. The URL source of the iframe_fadeout frame declared at lines 49-50 is set at lines 43-45. It may be noted that the URL specified as the value of the "src" attribute (at line 43) causes the fadeout PHP script 602, "fadeout.php", to be called. Several parameters are passed to fadeout.php in the URL, including the "vid" parameter (indicating the video playing in video player 302), and the screen width and screen height. While not necessary, it may be desired to pass an indication of the video that is playing in video player 302 to PHP script 602 to allow the association of certain advertising campaigns with certain videos. The screen width and screen height may indicate the resolution at which the user is viewing webpage 300. As should now be apparent, conveniently, fadeout PHP script 602 is run inside the iframe_fadeout frame.

Moving on in the fadeout.html code (document 300), the setInterval(X, Y) function is called at line 46. As may be known to those skilled in the art, setInterval is a JAVASCRIPT function that triggers the expression X every Y milliseconds. Thus, line 46 causes the DisplayFadeout( ) function (FIG. 7) to be called every 1000 milliseconds (i.e. every second).

Turning now to FIG. 7, the DisplayFadeout( ) function, called at line 46 of document 300 (FIG. 6B) is defined in the fadeout.js script. If the ad_swf variable contains a value (i.e. indicating that an ad campaign has previously been identified by PHP script 602), <div> section 700 may be created (and given the name "aaaa") and inserted into document 300 (FIG. 7, lines 5-11) (FIG. 5, S5008). "aaaa"<div> element 700 is positioned relative to the parent element's position (i.e. the <body> element of document 300) such that it may overlay all of the underlying content of webpage 300. Moreover, notably, <div> section 700 may itself contain another <div> section 702 with id "fadeout" (FIG. 7, line 9).

Optionally, the browser may be detected and offsets to better position the advertising content may be applied (FIG. 7, line 13; FIG. 5, S5006).

The fadeout.js script may then call the load Flash Wmode( . . . ) function at lines 17-21, passing five parameters to the loadFlashWmode( . . . ) function. When execution returns from the loadFlashWmode( . . . ) function, the value stored in the ad_swf variable is cleared (so that the 'if' statement at FIG. 7, line 5 may evaluate to false and the code following the 'if' statement may not be executed again), and the JAVASCRIPT clearInterval( ) function called to turn off the setInterval( ) set in document 300 (at FIG. 6B, line 46).

Code for the loadFlashWmode( . . . ) function is provided in the flash.js script (FIG. 8). The purpose of this function is to embed FLASH object 802 in <div> section 702 (FIG. 7, line 9). More specifically, this function may take five parameters, "obj", "w", "h", "flash", and "vars". The values of these parameters may be passed from the fadeout.js script (FIG. 7, line 17). In particular, and referring back to FIG. 7, line 17, the value of the "obj" parameter that is passed is "fadeout" (referencing <div> section 702); the value of the "w" and "h" parameters may be the width and height of document 300 (possibly including offsets); the value of the "flash" parameter that is passed is "/sandbox/fadeout.swf" (referencing the FLASH movie file to be embedded, i.e., fadeout.swf); and the value of "vars" that is passed is a series of variables. The "w" and "h" parameters are used to specify the width and height of embedded FLASH object 802 (see FIG. 8, line 4). The source attribute of the FLASH object 802 (in particular, of the embed tag) is set to the movie specified by the "flash" variable (i.e. fadeout.swf) (FIG. 8, line 10), and the Flashvars attribute is set to the values stored in the "vars" variable (FIG. 8, line 10). As will be further explained below, the values in the Flashvars attribute may be passed to the ACTIONSCRIPT code contained in the fadeout.swf movie (FIG. 9).

Notably, the wmode attribute of the embed tag is set to "transparent", indicating that the background of the HTML page (i.e. document 300) shows through all transparent portions of the movie. It may be appreciated that other than setting the values of the specific variables, this manner of embedding a FLASH movie is conventional (see in this record, for example, a description of the FLASH OBJECT and EMBED tag attributes provided by Adobe Systems Incorporated). Lastly, FIG. 8, line 14 actually adds the text collected in the "txt" variable to fadeout <div> 702, thus resulting in the embedding of object 802 in document 300 (FIG. 5, S5010).

Figure 11:
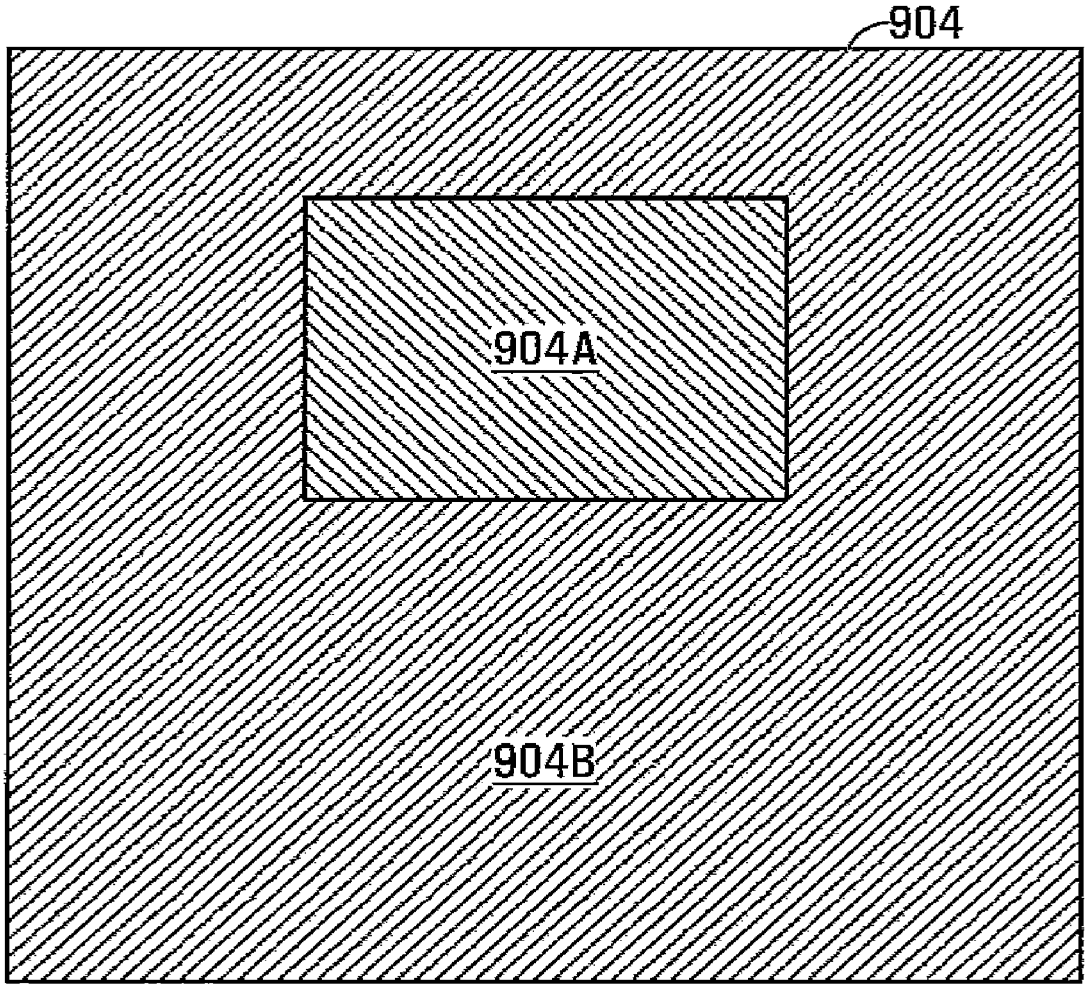
FIG. 11 is a block diagram showing selected components of an advertising content image overlaid on the exemplary webpage of FIG. 3.

FIG. 9 depicts ACTIONSCRIPT code contained in the fadeout.swf movie 900 file. Notably, the fadeout.swf movie 900 itself contains another swf movie 902 comprising a transparent PNG (Portable Network Graphics) image 904. Significantly, this image 904 may be advertising content 308. Also significantly, the alpha channel of certain pixels in image 904 may be set to allow video player 302 to show through image 904. As may be understood by a person of ordinary skill in the art, the PNG file format allows a single pixel value to be declared as transparent. Alternatively, an alpha channel can be added. For example, a pixel may have the value of (R,G, B,α), where R is the red value, G is the green value, and B is the blue value. α may take on a value between 0 and 1 where 0 may indicate no coverage (i.e. transparent), 1 may indicate full coverage (i.e. opaque), and fractional values may indicate partial coverage (see, for example, Porter, T. and Duff, T. "Compositing Digital Images" (July 1984), *Computer Graphics*, Vol. 18, Number 3, the contents of which are incorporated herein by reference). Thus, conveniently, as illustrated in FIG. 11, once the position of video player 302 in webpage 300 is known, image 904 can be manipulated such that the alpha channels of the pixels in area 904*a* (corresponding to the area occupied by video player 302) may be set to 0, so that image 904 at area 904*a* may be transparently rendered, thus allowing video player 302 to show through. The alpha channels of the pixels in area 904*b* may be set to 1, indicating that they should be rendered as opaque so that the image in area 904*b* may cover the content at that area in underlying webpage 300.

Returning to FIG. 9, line 2 of the fadeout.swf movie file calls the ACTIONSCRIPT root.createEmptyMovieClip( . . . ) with two parameters, "imageLoader" and '1'. As may be appreciated, this function creates dynamically, at runtime, the movie clip "imageLoader" (the instance name of the move clip, ad image 904, further described below) as a child of the existing movie clip (i.e. fadeout.swf) at a depth of 1. As may be understood by those of ordinary skill in the art, the depth value may be used to indicate an ordering of layers of FLASH objects.

Next, the loadMovie( . . . ) function is called at line 2 of FIG. 9 with two parameters, "_root.FadeOutSWF" and "imageLoader". Notably, the value of the first parameter was set by the fadeout.js script (at FIG. 7, lines 18-21) and specifies the FLASH movie file to be used for advertising content 308. As previously explained, the FLASH movie file may be tailored to certain user characteristic such as screen resolution. Line 2 of FIG. 9 then loads both movies specified by the parameters.

The background of the movie is then caused to fadeout in _root.fadeout_sec seconds using an ACTIONSCRIPT call to the Tween class at line 8. The ad image (i.e. "imageLoader") 904 is caused to fade out in _root.stay_secs seconds. Conveniently, the values of the _root.fadeout_sec and _root.stay_secs variables are passed from the fadeout.js script (more specifically, through the loadFlashWmode( . . . ) function call at lines 17-21 in FIG. 7 via Flashvars). Notably, if the value of the _root.fadeout_sec variable equals the value of the _root.stay_secs variable, then the background and ad image 904 will fadeout simultaneously. When the fadeouts of the background and ad image 904 are complete, the HideFadeOut( ) JAVASCRIPT function (FIG. 6B, lines 28-31) is called at line 15, FIG. 9, thus removing <div> section 700 (FIG. 7, line 7).

Figure 10:
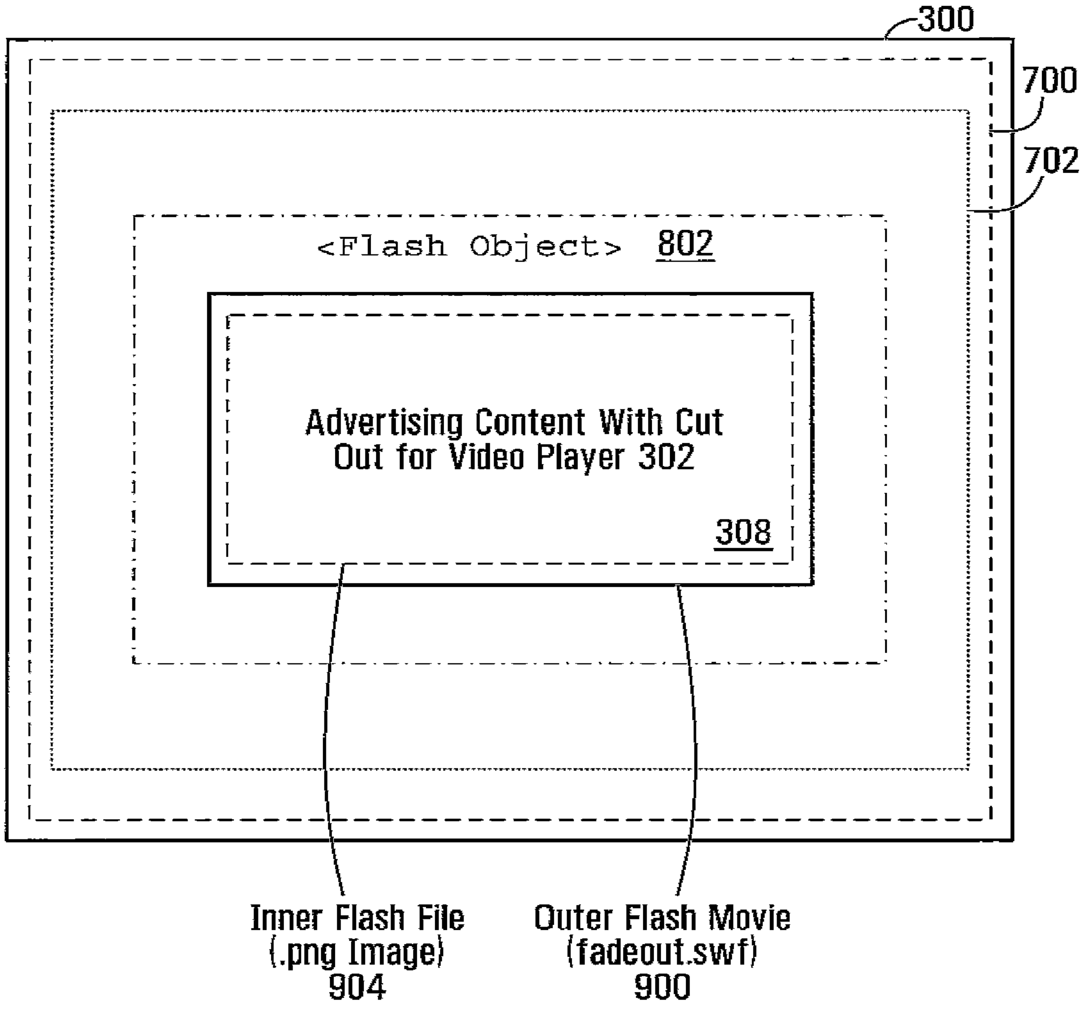
FIG. 10 is a block diagram showing the layers used to achieve fadeout effect of the present invention, as specified in the source code of FIGS. 6-9.

FIG. 10 provides a summary of the above. Specifically, it may be observed that the contents of <div> section 700 may be overlaid on the contents of webpage 300. <div> section 700, may contain another <div> section 702. In turn, <div> section 702 may contain embedded FLASH object 802. FLASH object 802 may itself contain an outer FLASH movie 900 and an inner FLASH movie, i.e. ad image 904 (the PNG image of advertising content 308). Image 904 may be transparent where it overlays video player 302 on webpage 300, but may be otherwise opaque, thus hiding the underlying content of webpage 300. In this manner, video player 302 may not be hidden by advertising content 308, even when advertising content 308 is displayed over webpage 300.

Although the primary embodiment of the invention described above has been coded using certain conventional software applications (e.g. FLASH), and certain programming and scripting languages (e.g. JAVASCRIPT and PHP), it may be appreciated that other software applications and programming and scripting languages could be used to implement the foregoing.

Also, it may be appreciated that as described above, FLASH was used to achieve the fade out effect of advertising content 308. However, other ways of implementing the same effect may be apparent to those of ordinary skill in the art.

For example, an exemplary method of achieving the fade out effect without using FLASH may be to load ad image 904 in an HTML <div> element, as described herein. A Cascading Style Sheet (CSS) may be associated with the <div> element. The CSS opacity property of the <div> element may then be manipulated via JAVASCRIPT code to create the fade out effect. Alternatively, the CSS filter property (e.g. alpha filter) may be used to create the fade out effect. Thus, in this alternate embodiment, the fade out effect may be implemented using a combination of JAVASCRIPT, CSS and HTML.

Furthermore, in the primary embodiment described above, alpha value 0 is used to denote a fully transparent pixel, while alpha value 1 is used to denote an opaque pixel. However, depending on the method or function used to achieve the fade out effect, it may be appreciated that transparency and opacity and states in between transparent and opaque may be denoted by values other than 0, 1 and values in between 0 and 1, respectively. For example, CSS alpha filter values may range from 0 to 100.

Additionally, while the first area of the embodiment described above contains video player 302, it may be appreciated that the first area could equally contain other content that is desired to be always visible. For example, an interactive computer game could be substituted for video player 302 in the first area.

Of course, the above described embodiments, are intended to be illustrative only and in no way limiting. The described embodiments of carrying out the invention, are susceptible to many modifications of form, arrangement of parts, details and order of operation. The invention, rather, is intended to encompass all such modification within its scope, as defined by the claims.

We claim:

1. A computer-implemented method of temporally displaying advertising content around a first visual component of a webpage, said webpage comprising a plurality of textual, graphical and audio/video components, said method comprising:

based on a position and size of said first visual component in said web page, overlaying an image on said webpage so as to cover a first area occupied by said first visual component and a second area surrounding said first area, said image being fully transparent throughout said first area and being opaque throughout said second area so as to hide original content of said webpage at said second area, said image hiding only said original content at said second area and not said original content at said first area, said image, at said second area, comprising advertising content;

increasing transparency of said image at said second area over a time interval so that said original content at said second area of said webpage is increasingly visible through said image over said time interval;

wherein said original content at said first area is visible throughout said time interval and at the end of said time interval said advertising content is no longer visible and said original content at said second area is fully visible; and wherein said overlaying said image on said webpage comprises overlaying said image on all of said webpage.

2. The method of claim 1 wherein said original content at said first area is a movie player window.

3. The method of claim 1 further comprising monitoring for an input event from a user indicating an interest in said advertising content during said time interval and further comprising upon receiving said input event, redirecting said user to a webpage associated with said advertising content.

4. The method of claim 3 wherein said monitoring for an input event comprises monitoring for a mouse click anywhere on said image.

5. The method of claim 1 wherein said webpage is defined by a first set of computer-executable instructions and wherein said overlaying said image and said increasing the transparency of said advertising content comprises inserting another set of computer-executable instructions at run-time into said first set of instructions, said another set of instructions for effecting said overlaying and said increasing the transparency.

6. The method of claim 5 wherein said first set of instructions comprises markup language instructions.

7. The method of claim 5 wherein said inserting another set of instructions comprises inserting markup language code.

8. The method of claim 5 wherein said inserting another set of instructions comprises inserting code of a scripting programming language.

9. The method of claim 5 wherein said inserting another set of instructions comprises inserting Cascading Style Sheet code.

10. The method of claim 5 further comprising removing said another set of computer-executable instructions from said first set of instructions upon completion of execution of said another set of computer-executable instructions.

11. The method of claim 1 wherein said advertising content comprises a video element.

12. The method of claim 1 further comprising setting alpha channel values of the pixels forming said image overlaying said first area to a value denoting fully transparent and setting alpha channel values of the pixels forming said advertising content overlaying said second area to a value denoting opaque at the beginning of said time interval.

13. The method of claim 12 wherein said increasing transparency of said advertising content over said time interval comprises transitioning alpha channel values of said pixels forming said advertising content overlaying said second area from said value denoting opaque at the beginning of said time interval to said value denoting fully transparent at the end of said time interval.

14. The method of claim 1 further comprising removing said image at the end of said time interval.

15. A computing device for temporally displaying advertising content around a first visual component of a webpage, said webpage comprising a plurality of textual, graphical and audio/video components, said device comprising:

a display;

a processor operable to:

based on a position and size of said first visual component in said web page, overlay an image on all of said webpage so as to cover a first area occupied by said first visual component and a second area surrounding said first area, said image being fully transparent throughout said first area and being opaque throughout said second area so as to hide original content of said webpage at said second area, said image hiding only said original content at said second area and not said original content at said first area, said image, at said second area, comprising advertising content;

increase transparency of said image at said second area over a time interval so that said original content at said second area of said webpage is increasingly visible through said image over said time interval;

wherein said original content at said first area is visible throughout said time interval and at the end of said time interval said advertising content is no longer visible and said original content at said second area is fully visible.

16. The computing device of claim 15 further comprising:

a user interface displayable on said display; and a mouse;

wherein said user interface monitors for a mouse-click generated by a user using said mouse anywhere on said image thereby indicating an interest in said advertising content during said time interval and further wherein upon receiving said mouse-click, said user interface redirects said user to a webpage associated with said advertising content.

17. The computing device of claim 15 wherein said processor is further operable to remove said image at the end of said time interval.

18. A system for displaying advertising content comprising:

a first computing device operable to:

serve a webpage over a communications network to a recipient device, said webpage comprising original content, said original content comprising a plurality of textual, graphical and audio/video components;

serve advertising content over said communications network to said recipient device; and serve instructions over said communication network to said recipient device, said instructions, which when executed by said recipient device, cause said recipient device to:

based on a position and size of a first visual component in said web page, overlay an image on all of said webpage at the beginning of a time interval so as to cover a first area occupied by said first visual component and a second area surrounding said first area, said image being initially fully transparent throughout said first area and opaque throughout said second area so as to hide said original content of said webpage at said second area, said image hiding only said original content at said second area and not said original content at said first area, said image, at said second area, comprising said advertising content;

display said original content at said first area throughout said time interval;

increase transparency of said advertising content over said time interval so that said original content at said second area of said webpage is increasingly visible through said advertising content over said time interval; and at the end of said time interval, display said original content of said webpage at said second area such that at the end of said time interval said advertising content is no longer visible and said original content at said second area is fully visible.

19. The system of claim 18 further comprising:

a second computing device operable to receive said webpage and said image comprising said advertising content, said second computing device comprising:

a display; and a processor operable to: (i) receive said instructions, and (ii) in accordance with said instructions:

based on a position and size of said first visual component in said web page, overlay said image on all of said webpage at the beginning of a time interval so as to cover a first area occupied by said first visual component and a second area surrounding said first area, said image being initially fully transparent throughout said first area and opaque throughout said second area so as to hide said original content of said webpage at said second area, said image hiding only said original content at said second area and not said original content at said first area, said image, at said second area, comprising said advertising content;

display said original content at said first area throughout said time interval;

increase transparency of said advertising content over said time interval so that said original content at said second area of said webpage is increasingly visible through said advertising content over said time interval; and at the end of said time interval, display said original content of said webpage at said second area such that at the end of said time interval said advertising content is no longer visible and said original content at said second area is fully visible.

20. The system of claim 18 further comprising:

a user interface displayable on said display; and a mouse;

wherein said user interface monitors for a mouse click generated by a user anywhere on said image thereby indicating an interest in said advertising content during said time interval and upon receiving said mouse click, redirect said user to a webpage associated with said advertising content.

21. The system of claim 18 wherein said original content at said first area is a movie player window.

* * * * *